United States Patent
Casal Kulzer (10) Patent No.: US 7,756,627 B2
(45) Date of Patent: Jul. 13, 2010

(54) PROCEDURE FOR THE OPERATION OF AN INTERNAL COMBUSTION ENGINE

(75) Inventor: Andre F Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 11/824,861

(22) Filed: Jul. 3, 2007

(65) Prior Publication Data

US 2008/0010000 A1  Jan. 10, 2008

(30) Foreign Application Priority Data

Jul. 5, 2006  (DE) .................. 10 2006 031 033

(51) Int. Cl.
*F02D 13/02* (2006.01)
*F02M 25/07* (2006.01)
*G01M 15/11* (2006.01)

(52) U.S. Cl. ............................................. 701/104

(58) Field of Classification Search ............... 701/104, 701/102, 101, 103, 105; 123/295, 299, 305, 123/406.12, 406.14, 406.27, 406.47
See application file for complete search history.

(56) References Cited

U.S. PATENT DOCUMENTS

| 6,098,596 | A | * | 8/2000 | Polach ........................ 123/435 |
| 6,260,520 | B1 | | 7/2001 | Van Reatherford |
| 6,390,054 | B1 | | 5/2002 | Yang |
| 7,421,999 | B2 | * | 9/2008 | Kim et al. ................... 123/295 |
| 7,588,019 | B2 | * | 9/2009 | Casal Kulzer .......... 123/568.14 |

FOREIGN PATENT DOCUMENTS

| DE | 199 27 479 | 12/1999 |
| WO | WO 98/10179 | 3/1998 |

* cited by examiner

*Primary Examiner*—Hieu T Vo
(74) *Attorney, Agent, or Firm*—Merchant & Gould P.C.

(57) ABSTRACT

Procedure and device for the operation of a gasoline engine with direct gasoline injection and with a variable valve-train assembly in a mode of operation with self-ignition, in which when a deviation by the actual values of physical parameters characterizing a combustion from set point values occurs in a work cycle, a closed-loop control of the actual values results in such a way that in succeeding work cycles, conditions, particularly a thermodynamic state of a combustible gas in a combustion chamber, exist for the mode of operation with self-ignition.

10 Claims, 2 Drawing Sheets

PROCEDURE FOR THE OPERATION OF AN INTERNAL COMBUSTION ENGINE

The invention at hand concerns a procedure for the operation of a gasoline engine with direct gasoline injection as well as a control unit and a computer program to execute the procedure.

Direct gasoline injection and variable valve-train assemblies in the gasoline engine deployed as the internal combustion engine are the state of the art. These also provide the possibility to demonstrate homogeneous, motor-driven combustion processes. On the one hand, homogeneous combustion processes with externally-supplied ignition and stratified, gasoline engine combustion processes, whereby in both cases direct gasoline injection is present with variable valve-train assemblies, are known. On the other hand, new, homogeneous, self-igniting combustion processes are being examined on account of their maximum potential for reduced fuel consumption and reduced emissions. In connection with the new, self-igniting combustion processes, the open-loop/closed-loop control of the self-ignition as well as the engine-map range, in which this combustion process can be deployed, plays a decisive role.

In gasoline driven internal combustion engines with direct gasoline injection, which are known from the state of the art, gasoline is directly injected into the combustion chamber of a cylinder of the internal combustion engine. The gasoline-air mixture compressed in the combustion chamber is subsequently ignited in the combustion chamber by the ignition of a spark. The volume of the ignited gasoline-air mixture expands explosively and sets a reciprocating piston in motion in the cylinder. The reciprocating motion of the piston is transferred to the crankshaft of the internal combustion engine.

Direct gasoline injected internal combustion engines can be operated in different modes of operation. A so-called stratified operation is known as a first mode of operation, which is especially used for smaller loads. A so-called homogenous operation is known as a second mode of operation, which is implemented for larger loads applied to the internal combustion engine. The different modes of operation differ especially in the point of injection time and the duration of injection as well as in the ignition timing.

During the operation of an internal combustion engine in the HCCI mode (Homogeneous Charge Compression Ignition), which is also sometimes referred to as CAI (Controlled Auto Ignition), ATAC (Active Thermo Atmosphere Combustion) or TS (Toyota Soken), the ignition of the fuel-air mixture does not result from externally-supplied ignition but from controlled self-ignition. The HCCI combustion process can, for example, be brought about by a high proportion of residual gases and/or by a high compression and/or a high temperature of the inflowing air. A precondition for the self-ignition is a sufficiently high energy level in the cylinder. Internal combustion engines capable of being operated in the HCCI mode are known, for example, from the U.S. Pat. No. 6,260,520, the U.S. Pat. No. 6,390,054, the German patent 199 27 479 and the patent WO 98/10179.

The HCCI combustion has in contrast to a conventional combustion with externally-supplied ignition the advantage of less fuel consumption and fewer toxic emissions. However, the closed-loop control of the combustion process and especially the open-loop control of the self-ignition of the fuel-air mixture is complex. Thus, a closed-loop control of the control variables influencing the combustion process is necessary. The control variables are for the fuel injection (injection quantity, respectively point of injection time and duration of injection), internal and external exhaust gas recirculation, intake and exhaust valves (variable valve control system), exhaust gas backpressure (exhaust gas flap), if need be an ignition backup, air inflow temperature, fuel quality and compression ratio in internal combustion engines with varying compression ratios.

New, homogeneous, gasoline driven combustion procedures are only useful in a limited engine-map range and then only during a very well defined thermodynamic state of the cylinder charge, especially in the case of high temperatures caused by a large exhaust gas recirculation, respectively exhaust gas retention. A task of the invention at hand is to further minimize fuel consumption and emissions.

An additional task of the invention at hand is to avoid misfires especially during fluctuations of the operating parameters of the combustion in a self-ignited mode of operation, respectively to allow for a regeneration of the combustion after a misfire.

This task is solved by a procedure for the operation of a gasoline engine with direct gasoline injection and with a variable valve-train assembly in a mode of operation with self-ignition; whereby when a deviation by the actual values of physical parameters characterizing a combustion from set point values occurs in a work cycle, a closed-loop control of the actual values results in such a way that in succeeding work cycles, conditions, particularly a thermodynamic state of a combustible gas in a combustion chamber, exist for the mode of operation with self-ignition. The actual values of the parameters characterizing the combustion are, for example, the temperature of the gas in the combustion chamber before, during and after the combustion, the pressure of the gas in the combustion chamber before, during and after the combustion, the lambda value, ignition timing and the like. The actual values are thereby the measured or modeled values, which are actually present. The set point values are the target specifications to be achieved. The thermodynamic state of the combustible gas in the combustion chamber is especially the pressure and the temperature as well as the lambda value of the combustible gas.

Provision is preferably made in the event of a misfiring of a cylinder for a change in the parameters of the combustion in the cylinder to result in such a way that a self-ignition again takes place in at least one of the combustion cycles following the misfire. The parameters, which are amenable to a closed-loop control, are the actual values previously mentioned, which in a closed-loop control are adjusted particularly cycle-synchronously to set point values. Provision is preferably made—in case a misfire occurs—for a transfer to a mode of operation with an externally-supplied ignition in at least one combustion cycle following the misfire. Therefore, for at least one combustion cycle following the misfire, an externally-supplied ignition of the fuel-air mixture, for example by way of a spark plug, is brought about during the combustion cycle.

Provision is preferably made for the compression ratio to be increased in at least one combustion cycle following the misfire. This can, for example, occur by way of a mechanical device to alter the compression ratio, but can, however, also result, for example, by way of an alteration of the control time of the intake and exhaust valves. The compression ratio is preferably set once again to the value before the misfire after the parameters have been achieved, which allow for a self-ignition. Provision can likewise be made for a quantity of fuel injected and/or a point of injection time to be altered in at least one combustion cycle following the misfire. The alteration of the quantity of fuel injected and/or the point of injection time has the goal of bringing about conditions for the subsequent combustion cycles, which allow for the transition back into a self-ignition. A residual gas recirculation can likewise be altered in at least one combustion cycle following the misfire by way of an air pathway and/or a variable valve train. An air flow adaptation can likewise additionally or alternatively take place. A higher as well as a lower residual gas proportion especially via an external exhaust recirculation but also via an internal gas recirculation (exhaust gas retention) can be utilized. Provision is preferably made for the compression ratio and/or the quantity of fuel injected and/or the point of injection time and/or the residual gas recirculation and/or the air flow to be controlled cycle-synchronously in a closed-loop.

The problem mentioned at the beginning of the application is also solved by a computer program with a program code for the implementation of all the steps in accordance with a procedure according to the invention if the program is executed in a computer, particularly a control unit.

The problem mentioned at the beginning of the application is also solved by a device, especially a control unit, for the operation of a gasoline engine with direct gasoline injection and with a variable valve-train assembly in a mode of operation with self-ignition, whereby when a deviation by the actual values of physical parameters characterizing a combustion from set point values occurs in a work cycle, a closed-loop control of the actual values results in such a way that in succeeding work cycles, conditions, particularly a thermodynamic state of a combustible gas in a combustion chamber, exist for the mode of operation with self-ignition.

An example of embodiment of the invention at hand is subsequently explained in detail using the accompanying diagrams. They thereby show.

Figure 1:
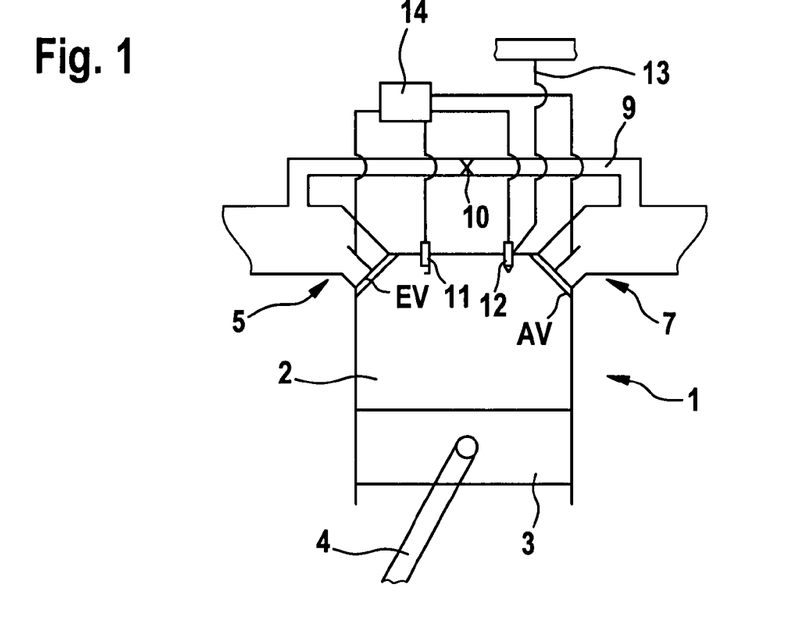
FIG. 1 a schematic depiction of a cylinder of an internal combustion engine with a fuel supply system.

FIG. 1 shows a schematic depiction of a cylinder of an internal combustion engine with the accessory components of the fuel supply system. An internal combustion engine with direct fuel injection (gasoline engine with direct gasoline injection BDE) is exemplary depicted with a fuel tank 11, at which an electric fuel pump (EFP) 12, a fuel filter 13 and a low pressure regulator 14 are disposed. A fuel line 15 leads from the fuel tank 11 to a high pressure pump 16. A storage chamber 17 is attached to the high pressure pump 16. Fuel injection valves 18 are disposed at the storage chamber 17, which preferably are directly assigned to combustion chambers 26 of the internal combustion engine. In the case of internal combustion engines with direct fuel injection, each combustion chamber 26 is assigned at least one fuel injection valve 18. Provision can also, however, be made here for several fuel injection valves 18 to be assigned to each combustion chamber 26. The fuel is conveyed out of the fuel tank 11 by the electric fuel pump 12 across the fuel filter 13 and the fuel line 15 to the high pressure pump 16. The fuel filter 13 has the task of removing foreign particles from the fuel. With the aid of the low pressure regulator 14, the fuel pressure in a low pressure section of the fuel supply system is set by way of a closed-loop control to a predetermined value, which for the most part lies in the magnitude of approximately 4 to 5 bar. The high pressure pump 16, which is preferably driven directly by the internal combustion engine, compresses the fuel and conveys it into the storage chamber 17. The fuel pressure achieves in the process values up to approximately 150 bar. A combustion chamber 26 of an internal combustion engine with direct fuel injection is depicted as an example in FIG. 1. Generally the internal combustion engine has several cylinders, which each contain a combustion chamber 26. At least one fuel injection valve 18, at least one spark plug 24, at least one intake valve 27 and at least one exhaust valve 28 are disposed at the combustion chamber 26. The combustion chamber is constrained by one piston 29, which can travel up and down in the cylinder. Fresh air from the intake manifold 36 is drawn into the combustion chamber 26 via the intake valve 27. With the aid of the fuel injection valve 18, fuel is directly injected into the combustion chamber 26 of the internal combustion engine. The fuel is ignited with the spark plug 24, provided that an externally-supplied ignition is present. The piston 29 is driven by the expansion of the ignited fuel. The motion of the piston 29 is transferred to the crankshaft 35 by means of a connecting rod 37. A segmental wheel 34 is disposed on the crankshaft 35, which is traced by an engine rotational speed sensor 30. The engine rotational speed sensor 30 produces a signal, which characterizes the rotational motion of the crankshaft 35.

The exhaust gases resulting from the combustion travel by way of the exhaust valve 28 out of the combustion chamber 26 to an exhaust gas pipe 33, in which a temperature sensor 31 and a lambda probe 32 are disposed. With the aid of the temperature sensor 31, the temperature is acquired; and with the aid of the lambda probe 32, the oxygen content of the exhaust gases is acquired.

A pressure sensor 21 and a pressure control valve 19 are attached to the storage chamber 17. The pressure control valve 19 is connected to the storage chamber 17 on the input side. On the output side a backflow line 20 leads to the fuel line 15.

Instead of a pressure control valve 19 a quantity control valve can also be used in the fuel supply system 10. With the aid of the pressure sensor 21, the actual value of the fuel pressure is acquired in the storage chamber 17 and supplied to a control unit 25. A control pulse is formed by the control unit 25 on the basis of the acquired actual value of the fuel pressure. The pressure control valve is then actuated with the control pulse. The fuel injection valves 18 are actuated by unspecified electrical output stages, which can be disposed within or outside of the control unit 25. The various actuators and sensors are connected to the control unit 25 by way of control signal lines 22. Various functions, which serve to control the internal combustion engines, are implemented within the control unit 25. In modern control units, these functions are programmed on a data processor and subsequently deposited in a memory of the control unit 25. The functions deposited in the memory are activated as a function of the demands placed on the internal combustion engine. In this connection especially rigorous demands are placed on the real time capability of the control unit 25. In principle a pure hardware implementation of the control of the internal combustion engine is possible as an alternative to a software implementation.

In the engine air intake tract 36, a throttle valve 38 is disposed, whose angle of rotation is adjustable by the control unit 25 via a signal line 39 and an associated, unspecified, electrical actuator.

An additional ignition mechanism 40 can be disposed at the combustion chamber. This can be in the form of an additional spark plug in addition to the spark plug 24 or, for example, a laser or the like. The externally-supplied ignition to bring about the self-ignition, which is subsequently described, is triggered by the additional ignition mechanism 40 or the spark plug 24. The additional ignition mechanism 40 is controlled by the control unit 25 and is for that reason connected electrically to it.

In a first mode of operation, the homogeneous operation of the internal combustion engine, the throttle valve 38 is partially opened or respectively closed as a function of the desired air mass to be supplied. The fuel is injected into the combustion chamber 26 by the fuel injection valve 18 during an air intake stroke initiated by the piston 29. The fuel injected is eddied by the air simultaneously drawn into the combustion chamber 26, where it consequently is for the most part evenly/homogeneously distributed. The fuel-air mixture is subsequently compressed during the compression stroke, in which the volume of the compression chamber 26 is reduced by the piston 29, in order for it then to be ignited by the spark plug 24 shortly before the piston 29 achieves top dead center.

In a second mode of operation, the stratified operation of the internal combustion engine, the throttle valve 38 is opened widely. The fuel is injected into the combustion chamber 26 by the fuel injection valve 18 during the compression stroke initiated by the piston 29. Then the fuel is ignited as before with the aid of the spark plug 24, so that the piston 29 is driven by the expansion of the ignited fuel in the now ensuing power phase. An additional possible mode of operation is the homogeneous lean operation, in which fuel is injected into the combustion chamber 26 during the air intake phase as in the homogeneous operation.

Figure 2:
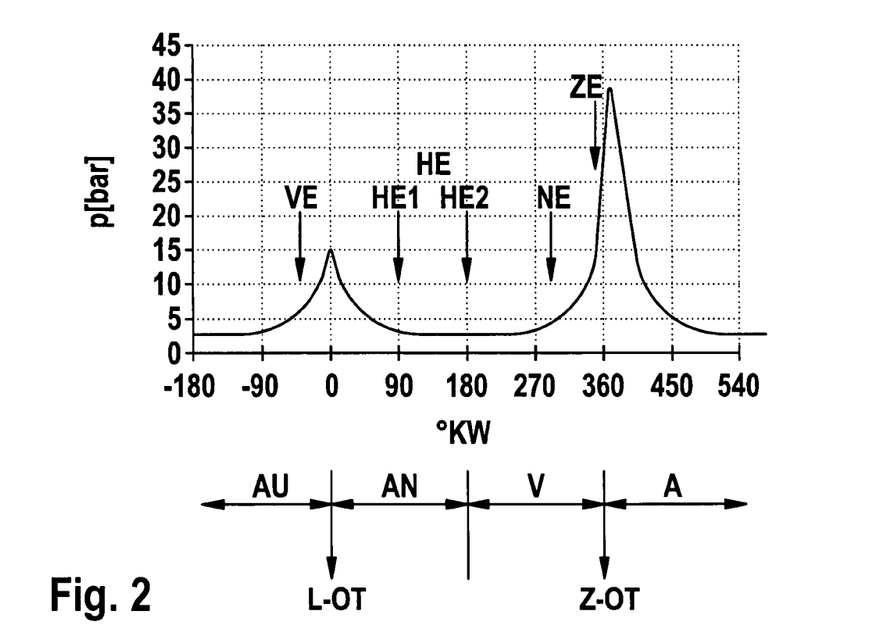
FIG. 2 a diagram of the combustion chamber pressure plotted against the crankshaft angle.

FIG. 2 shows a diagram of the combustion chamber pressure in the combustion chamber 26 of the internal combustion engine plotted against the crankshaft angle in degrees of the crankshaft (°KW). To the right of the ordinate, a crankshaft angle of −180° to 540° is depicted. The combustion chamber pressure is plotted in bar above the abscissa. Top dead center is randomly selected here at 0° in the gas-exchange cycle L-OT. The gas-exchange cycle makes in a known manner for the discharge of combusted exhaust gases. This takes place here between −180° and 0° of the crankshaft angle. The gas-exchange cycle also makes in a known manner for the intake of fresh ambient air, respectively of a fuel-air mixture. This takes place here in the crankshaft angle range of 0-180°. The pressure curve depicted in FIG. 2 and the valve lift curves deal with typical curves for the controlled self-ignition. The exhaust valve closes long before the gas-exchange cycle L-OT, so that a large proportion of residual gas remains in the combustion chamber, which is compressed during the gas-exchange cycle. The intake valve only opens if a pressure equilibrium again prevails between the intake manifold and the combustion chamber. One crankshaft rotation further, at a crankshaft angle of 360°, the top dead center of the ignition (ignition TDC) is achieved. In FIG. 2 the compression stroke takes place between 180° of the crankshaft angle and 360° of the crankshaft angle. The expansion of the combusting gases takes place between 360° of the crankshaft angle and 540° of the crankshaft angle. The individual strokes are designated in FIG. 2 with discharge AU from −180° to 0°, air intake AN from 0° to 180°, compression stroke (compression) V from 180° to 360° and expansion (combustion) E from 360° to 540°. During the compression stroke, the air, respectively fuel-air mixture or fuel-air-exhaust gas mixture is compressed and thereby heated. The mixture is ignited as a rule shortly before reaching ignition top dead center. This can occur as is common in gasoline engines by means of an externally-supplied ignition or in accordance with the mode of operation according to the invention by means of a controlled self-ignition. The ignition of the mixture leads in a known manner to a pressure increase, which is converted into mechanical energy in the immediately subsequent combustion cycle.

In the mode of operation of the controlled self-ignition, the injection occurs already in the gas-exchange cycle and the self-ignition (refer to FIG. 2) shortly before the achievement of the ignition top dead center. For that reason it is required for the gas-air-fuel-exhaust gas mixture to have a sufficient ignition temperature.

Implementation of a cylinder cutoff with the controlled self-ignition of a gasoline engine is very sensitive because the thermodynamic conditions, which are required for the self-ignition, must be set very exactly. If need be, the aid of a closed loop control is required here, which corrects a map-based pilot control.

The self-ignition is very sensitive to the thermodynamic conditions, which are required in order to very accurately achieve the desired combustion process. In the case that parameter fluctuations result in an instable self-ignition operation up to the point of misfires, a remedy must be found quickly and therefore cycle-synchronously. There are ranges in the self-ignition operation, which can produce more quickly an instable operation on account of the more sensitive combustion, which occurs at too high or too low of a load, respectively too high or too low of a temperature/enthalpy of the gas in the combustion chamber of the respective cylinder. With the aid of a cycle-synchronous closed-loop control, the stable operation can be maintained, respectively regained in the case that a misfire should arise. By a cycle-synchronous closed-loop control, a closed-loop control is understood, which can effect a change in the parameters to be controlled, respectively a modification of the physical factors, which function as control variables for the closed-loop control, from one operating cycle to another operating cycle or even within an operating cycle. For example the point of injection time and the quantity of fuel injected can be changed within a cycle (combustion cycle); hence control variables are altered as a result of measured variables, which were measured in the same combustion cycle. This pertains of course not only to the point of injection time and the quantity of injected fuel but also for other parameters as, for example, opening and closing points in time of the charge-cycle valves, quantity of the internal and external exhaust gas recirculation, position of the exhaust gas control butterfly valve and of a throttle valve etc.

If an abnormality of the sensor detected (measured or modeled) combustion characteristics occurs in a given operating cycle (sensor detection or modeling of combustion chamber factors, such as, for example, pressure, temperature, ion current and the like), the cycle-synchronous closed-loop control intervenes in order to avoid a misfire (as much as possible) in the next operating cycle. The cycle-synchronous closed-loop control is preferably a model based closed-loop control on account of the physically very sensitive combustion.

Figure 3:
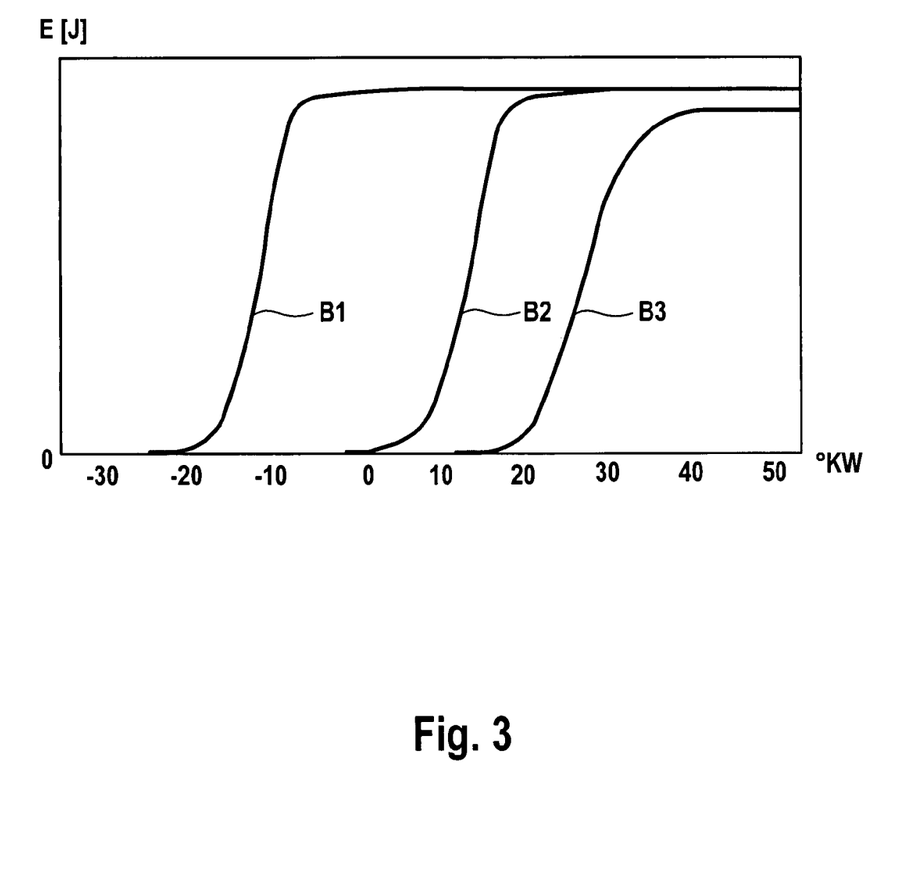
FIG. 3 a diagram of the energy released by means of the crankshaft angle for differing combustion curves.

FIG. 3 shows a diagram of the energy E released via the crankshaft angle (°KW) in joules for differing combustion curves. A curve B1 with an early combustion state, a curve B2 with a late combustion state and a curve B3 with a very late combustion state are depicted. In each case the cumulative combustion curve is depicted, i.e. the total energy released by way of the crankshaft angle. In the case of the early and late combustion states, i.e. the curves B1 and B2, the same total energy is released. The early combustion state produces a lower exhaust gas enthalpy than is the case for the late combustion state. In the case of the very late combustion state, depicted in curve B3, less combustion energy is released than is the case for the early and late combustion states.

The result is that a smaller exhaust gas enthalpy than desired, respectively needed, is achieved.

For example, in the case of a combustion taking place too early in the mode of operation with self-ignition, the conditions for self-ignition have to be improved on account of the greater heat losses as opposed to a mode of operation with an externally-supplied ignition (on account of higher pressures and temperatures), which result from the early combustion state. The mixture temperature must, for example, be raised (for example by a larger quantity of hot residual gas) in order to avoid too long of a delay of the self-ignition. This can be achieved by an early closing of the exhaust valve when using a valve strategy with negative valve overlap. In so doing, a larger residual gas mass is enclosed in the combustion chamber for the next operating cycle. When using a valve strategy with positive valve overlap (or, for example, double opening of the exhaust valve), the exhaust valve has to remain open longer, so that more residual gas can enter into the combustion chamber. These steps also have at the same time the advantage that the mixture thus becomes richer, and the self-ignition delay is thus shortened. It is also possible by way of an early fuel injection, especially in the phase of the negative valve overlap, to make the breakdown of fuel possible already before the compression stroke and in so doing achieve a reduction in the ignition delay. By way of a variation of the injection quantity during the air intake stroke, respectively by means of multiple injections including an injection during the compression stroke, a shift in the start of the self-ignition can be brought about as a result of varying degrees of homogeneity, respectively varying thermodynamic conditions of the mixture.

When combustion takes place too late, the self-ignition conditions must be reduced on account of the lower heat losses in the mode of operation with self-ignition as compared to the mode of operation with an externally-supplied ignition. This is done in order to avoid a self-ignition occurring too early in the next operating cycle. In so doing the steps described previously can be taken in the reverse order.

When combustion takes place even later (curve B3 in FIG. 3), it can come to the point where the combustion no longer takes place to the normal degree, and a reduced quantity of combustion energy is released; hence a lower exhaust gas enthalpy than desired, respectively than is necessary, also results. In which case, this enthalpy is not able to initiate a self-ignition in the next operating cycle. As a result an additional self-ignition with reduced exhaust gas enthalpy or even a misfire can occur if an intervention of the control unit does not take place. When the exhaust gas enthalpy is too low, steps have to be initiated to increase the temperature of the fuel-air mixture and/or the ignitability of the mixture. Steps can be deployed for this purpose as previously described in the case of the combustion taking place too early. At this point, attention must be paid to a very exact analysis of the combustion energy released (from the combustion curve computation and the heat curve computation) or to an equivalent variable in order to achieve a better estimate, respectively computation, of the exhaust gas temperature available in the next operating cycle, respectively exhaust gas enthalpy. It can than be decided with this computation regarding the condition of the exhaust gas as to how much steps have to be taken to increase the self-ignitability.

If the internal combustion engine possesses a variable compression ratio, this is also useful here in order to control the conditions for self-ignition. Even if the engine does not have a self-contained system to alter the compression ratio, the actual compression ratio can be altered by means of a variability in the intake valve train, whereby the point in time of the intake-valve closing is shifted. The stochastic of the combustion process, respectively the engine components, can of course play an important role. This must at the same time be taken into account as a function of its relevance in the closed-loop control.

The conditions for self-ignition must be restored after a misfire in the event the internal combustion engine is supposed to continue to be driven in this mode of operation. Thus, an operational mode coordinator is required in the software of a control unit of the internal combustion engine for the purpose of making this decision. Two examples of embodiment of a procedure for restoration after a misfire will subsequently be described.

In a first example of embodiment, at least one operating cycle with an externally-supplied ignition is driven in order, for example, to again produce a sufficiently hot residual gas by means of an adjusted fuel injection and ignition. This residual gas can then be recirculated in the next cycle (exhaust gas retention and/or exhaust gas recirculation) in order to set the desired temperature, respectively enthalpy for the self-ignition. The recirculation of residual gas with the suitable temperature can be achieved by exhaust gas retention, respectively exhaust gas recycling/forward displacement (negative, respectively positive valve overlap) or exhaust gas recirculation (from an external exhaust gas line) or a mixture of internal and external exhaust gas recirculation. Table 1 shows a sequence of the procedure, which is depicted in table form over several operating cycles.

TABLE 1

| Cycle | Combustion Process | Closed-loop Control |
|---|---|---|
| ... | Self-ignition | Cycle-synchronous closed-loop control |
| Z − 1 | Self-ignition | Cycle-synchronous closed-loop control |
| Z | Misfires | Dramatic fluctuation in certain parameter(s) - Cycle-synchronous closed-loop control in this cycle not able to avoid misfires |
| Z + 1 | Externally-supplied ignition | Fuel injection and ignition adapted for operation with externally-supplied ignition - Cycle-synchronous closed-loop control |
| Z + x | Externally-supplied ignition | Fuel injection and ignition adapted for operation with externally-supplied ignition, while additionally taking into account the required conditions for self-ignition in the next cycle - cycle-synchronous closed-loop control - End of transition |
| Z + x + 1 | Self-ignition | Cycle-synchronous closed-loop control |
| ... | Self-ignition | Cycle-synchronous closed-loop control |

Whereby x = for example 1-3 cycles

In a second example of embodiment of the procedure according to the invention, an alteration of the parameters influencing the combustion again causes a combustible mixture capable of self-igniting to be present in the respective cylinder in the next or one of the next operating cycles. If the internal combustion engine has the ability to regulate a variable compression ratio, it is possible by means of a quick (most suitably cycle-synchronous) increase in the compression ratio to restore the self-ignition. This is best facilitated accessorily or in the case of an engine without a mechanically variable compression ratio by regulating the effective compression ratio using intake-valve closing. In this way the mixture of air, residual gas (Also additionally external exhaust gas recirculation is possible.) and fuel is again impelled into the self-igniting combustion. This means that it is possible already during the next cycle after the misfire to adjust to the desired temperature, respectively enthalpy, for self-ignition by increasing the compression ratio accordingly. At the same time, a restorative transition in the self-ignition mode of operation is necessary, which should restore the desired self-ignition operation adjustments in the region of the load-rotational speed-engine characteristic map.

TABLE 2

| Cycle | Combustion Process | Closed-loop Control |
|---|---|---|
| . . . | Self-ignition | Cycle-synchronous closed-loop control |
| Z − 1 | Self-ignition | Cycle-synchronous closed-loop control |
| Z | Misfires | Dramatic fluctuation in certain parameter(s) - Cycle-synchronous closed-loop control in this cycle not able to avoid misfires |
| Z + 1 | Self-ignition | Compression ratio increase; fuel injection, residual gas recirculation and ignition adapted for re-entry into the self-ignition operation - Cycle-synchronous closed-loop control |
| Z + x + 1 | Self-ignition | Adaptation (if necessary reduction) of the compression ratio; fuel injection, residual gas recirculation and ignition adapted for self-ignition operation - Cycle-synchronous closed-loop control - End of restorative transition |
| . . . | Self-ignition | Cycle-synchronous closed-loop control |

Whereby x = for example 1-3 cycles

Z denotes respectively in table 1 and 2 a working cycle, also denoted as cycle, in which a combustion cycle thus occurs, i.e. an ignition of an ignitable mixture by way of an externally-supplied ignition or a self-ignition. The combustion cycles are thereby counted from a misfire to the combustion cycle Z. Combustion cycles, which have previously taken place are numbered as Z-1, Z-2, etc. Combustion cycles, which take place after the combustion cycle Z, are numbered as Z+1 up to Z+x. The closed-loop control of the valve-train assembly, the closed-loop control of the exhaust gas recirculation, the closed-loop control of the throttle valve position and the closed-loop control of the fuel injection (which refers both to the closed-loop control of the quantity of fuel injected as well as the point of injection time) occur cycle-synchronously, i.e. a closed-loop control takes place for every individual working cycle of each one of the cylinders. The closed-loop control does not take place in such a manner that the values to be regulated are held as constant as possible over several working cycles, but are varied as much as necessary from working cycle to working cycle. The cycle-synchronous closed-loop control is thus a closed-loop control, which intervenes into the operating parameters of each one of the working cycles and changes them if need be.

The invention claimed is:

1. A control unit that operates a gasoline engine with direct gasoline injection and a variable valve-train assembly in a mode of operation with self-ignition, wherein the control unit detects a deviation of actual values of physical parameters characterizing a combustion from set point values in a work cycle; and controls, in a closed-loop control, the actual values such that in succeeding work cycles, conditions, particularly a thermodynamic state of a combustible gas in a combustion chamber, exist for a mode of operation with self-ignition.

2. A control unit comprising a data processor and a memory upon which a computer program with program code is stored for the implementation of a method of operating a gasoline engine with direct gasoline injection and a variable valve-train assembly that, when executed by the data processor, cause the data processor to:

detect a deviation of actual values of physical parameters characterizing a combustion from set point values in a work cycle; and control in a closed-loop control, the actual values such that in succeeding work cycles, conditions, particularly a thermodynamic state of a combustible gas in a combustion chamber, exist for a mode of operation with self-ignition.

3. A method of operating a gasoline engine with direct gasoline injection and a variable valve-train assembly, the method comprising:

detecting a deviation of actual values of physical parameters characterizing a combustion from set point values in a work cycle; and controlling, in a closed-loop control, the actual values such that in succeeding work cycles, conditions, particularly a thermodynamic state of a combustible gas in a combustion chamber, exist for a mode of operation with self-ignition.

4. A method according to claim 3, further comprising when a misfire occurs in a cylinder, altering parameters of the combustion of the cylinder such that a self-ignition again takes place in at least one combustion cycle following the misfire.

5. A method according to claim 4, further comprising changing over to a mode of operation with an externally-supplied ignition in at least one combustion cycle following the misfire.

6. A method according to claim 4, further comprising increasing a compression ratio in at least one combustion cycle following the misfire.

7. A method according to claim 6, wherein the compression ratio is again set to a value before the misfire after achieving parameters that allow for a self-ignition.

8. A method according to claim 3, further comprising altering a quantity of fuel injected or an injection point of time in at least one combustion cycle following the misfire.

9. A method according to claim 3, further comprising altering a residual gas recirculation in at least one combustion cycle following the misfire.

10. A method according to claim 3, further comprising regulating cycle-synchronously in a closed-loop a compression ratio, quantity of fuel injected, a point of injection time, a residual gas recirculation, or a quantity of air.

* * * * *

UNITED STATES PATENT AND TRADEMARK OFFICE
CERTIFICATE OF CORRECTION

| | | |
|---|---|---|
| PATENT NO. | : 7,756,627 B2 | Page 1 of 4 |
| APPLICATION NO. | : 11/824861 | |
| DATED | : July 13, 2010 | |
| INVENTOR(S) | : Casal Kulzer | |

It is certified that error appears in the above-identified patent and that said Letters Patent is hereby corrected as shown below:

The title page showing the illustrative figure should be deleted to be replaced with the attached title page.

Drawings, Sheet 1 of 2: Delete Sheet 1 of 2 and replace with the attached drawing.

Drawings, Sheet 2 of 2: Delete Sheet 2 of 2 and replace with the attached drawing.

Signed and Sealed this
Twenty-second Day of March, 2011

David J. Kappos
*Director of the United States Patent and Trademark Office*

(12) United States Patent
Casal Kulzer (10) Patent No.: US 7,756,627 B2
(45) Date of Patent: Jul. 13, 2010

(54) PROCEDURE FOR THE OPERATION OF AN INTERNAL COMBUSTION ENGINE

(75) Inventor: Andre F Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 11/824,861

(22) Filed: Jul. 3, 2007

(65) Prior Publication Data
US 2008/0010000 A1 Jan. 10, 2008

(30) Foreign Application Priority Data
Jul. 5, 2006 (DE) .................. 10 2006 031 033

(51) Int. Cl.
*F02D 13/02* (2006.01)
*F02M 25/07* (2006.01)
*G01M 15/11* (2006.01)

(52) U.S. Cl. .................................................... 701/104

(58) Field of Classification Search ............... 701/104, 701/102, 101, 103, 105; 123/295, 299, 305, 123/406.12, 406.14, 406.27, 406.47
See application file for complete search history.

(56) References Cited

U.S. PATENT DOCUMENTS

| | | | |
|---|---|---|---|
| 6,098,596 A * | 8/2000 | Polach | 123/435 |
| 6,260,520 B1 | 7/2001 | Van Reatherford | |
| 6,390,054 B1 | 5/2002 | Yang | |
| 7,421,999 B2 * | 9/2008 | Kim et al. | 123/295 |
| 7,588,019 B2 * | 9/2009 | Casal Kulzer | 123/568.14 |

FOREIGN PATENT DOCUMENTS

| | | |
|---|---|---|
| DE | 199 27 479 | 12/1999 |
| WO | WO 98/10179 | 3/1998 |

* cited by examiner

*Primary Examiner*—Hieu T Vo
(74) *Attorney, Agent, or Firm*—Merchant & Gould P.C.

(57) ABSTRACT

Procedure and device for the operation of a gasoline engine with direct gasoline injection and with a variable valve-train assembly in a mode of operation with self-ignition, in which when a deviation by the actual values of physical parameters characterizing a combustion from set point values occurs in a work cycle, a closed-loop control of the actual values results in such a way that in succeeding work cycles, conditions, particularly a thermodynamic state of a combustible gas in a combustion chamber, exist for the mode of operation with self-ignition.

10 Claims, 2 Drawing Sheets

Fig. 1

Fig. 2